United States Patent [19]

Moyski et al.

[11] Patent Number: 5,185,803
[45] Date of Patent: Feb. 9, 1993

[54] COMMUNICATION SYSTEM FOR PASSENGER VEHICLE

[75] Inventors: Matthew T. Moyski, Fenton; Raymond C. Spitz, Canton, both of Mich.

[73] Assignee: Ford Motor Company, Dearborn, Mich.

[21] Appl. No.: 812,298

[22] Filed: Dec. 23, 1991

[51] Int. Cl.⁵ .............................................. H04B 1/00
[52] U.S. Cl. ...................................... 381/86; 381/77; 381/92; 379/390
[58] Field of Search ..................... 381/86, 82, 83, 77, 381/92, 93; 379/206, 390, 388, 395

[56] References Cited

U.S. PATENT DOCUMENTS

| | | | |
|---|---|---|---|
| 1,577,911 | 3/1926 | Koch et al. | |
| 1,905,215 | 4/1933 | Cadieux | |
| 3,922,488 | 11/1975 | Gabr | 179/1 HF |
| 4,184,048 | 1/1980 | Alcaide | 179/1 CN |
| 4,625,083 | 11/1986 | Poikela | 381/71 |
| 4,819,263 | 4/1989 | Franklin | 379/390 |
| 4,837,829 | 6/1989 | Lobb | 381/83 |
| 4,965,833 | 10/1990 | McGregor et al. | 381/83 |
| 5,003,606 | 3/1991 | Bordewijk | 381/93 |

Primary Examiner—Jin F. Ng
Assistant Examiner—Nina Tong
Attorney, Agent, or Firm—Mark Mollon; Roger L. May

[57] ABSTRACT

The invention enhances the ability of rear seat passengers in a vehicle to hear the speech of a front seat occupant. Two spaced microphones in the front seat area pick up speech signals which are differentially amplified and filtered in a bandpass filter and at least one notch filter. The filter signals are reproduced through speakers in the area of the rear seat. Differential amplification of the microphone signals results in greatly reduced acoustic feedback from the speakers to the microphones. The communication system of the invention is highly integrated into other communication and audio systems in the vehicle.

12 Claims, 2 Drawing Sheets

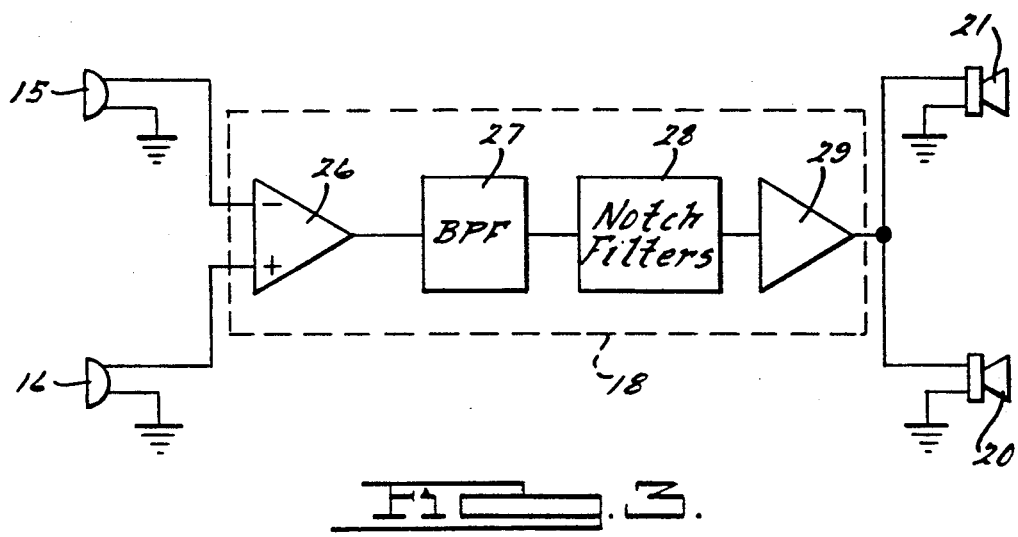
FIG. 3.
FIG. 4.
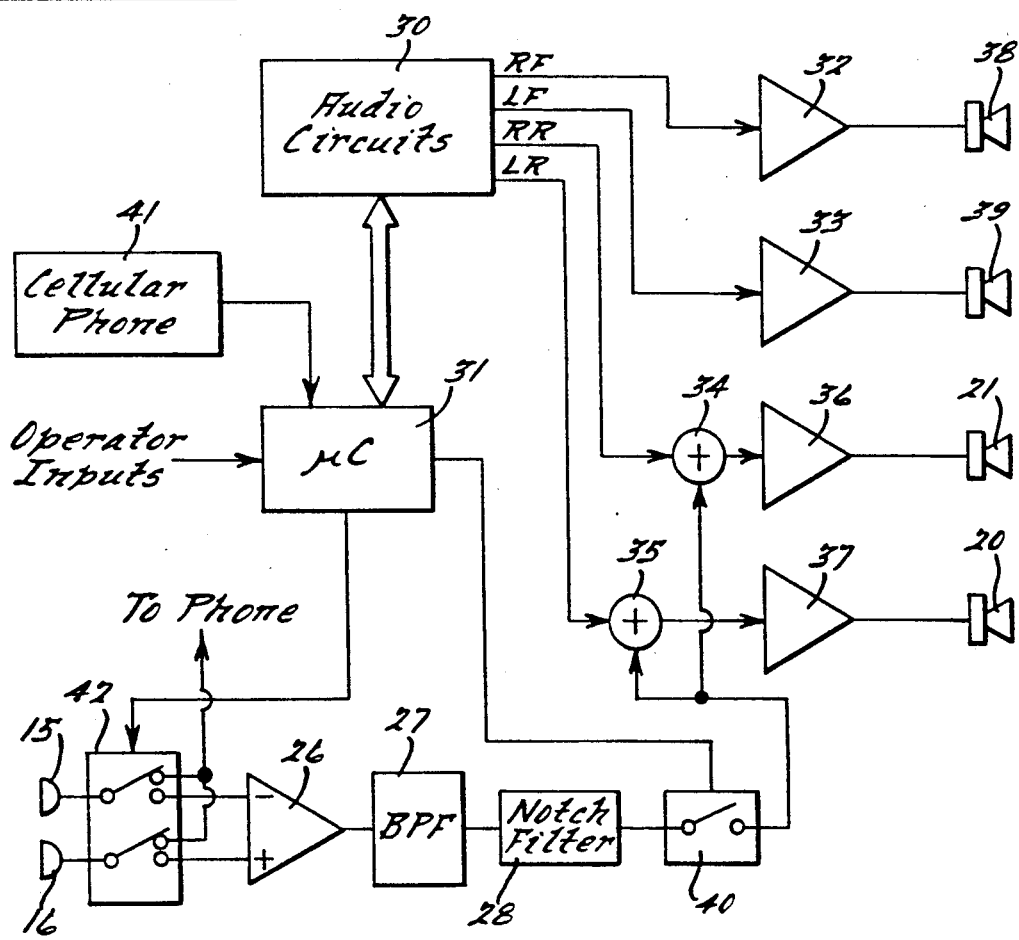

COMMUNICATION SYSTEM FOR PASSENGER VEHICLE

BACKGROUND OF THE INVENTION

The present invention relates in general to a communication system for transmitting voice information between front and rear seating areas in a vehicle, and more specifically, to a voice enhancement system avoiding audible feedback and which is easily integrated with an audio entertainment system and/or a mobile transceiver.

In a typical Passenger vehicle, a driver of the vehicle must, of necessity, face forward in the direction of forward travel of the vehicle. In passenger compartments containing additional rows of seats, the driver and any other front seat passengers are thus facing away from rear seat occupants. Consequently, in a car or van, for example, a backseat passenger may have difficulty understanding or hearing the speech of the driver or anyone else in the front row.

In order to improve intelligibility of speech, a front seat occupant may turn his or her head to face the rear seat occupants, or a rear passenger may lean forward to better hear the front seat occupant. However, these actions may cause inconvenience and discomfort for them.

It is known to use a microphone in the front or rear seating area to pick up voices which are then amplified and reproduced by an electromechanical transducer (e.g., speaker) in another seating area. A particular problem encountered in such a system is acoustic feedback between the speaker and microphone which can produce howling in the speaker when such feedback is excessive.

McGregor et al, U.S. Pat. No. 4,965,833, discloses a voice enhancer system wherein a frequency shifter increases the voice frequencies by about 5 Hz to prevent acoustical howl-around. In addition to microphones and speakers, McGregor et al employs a preamplifier, a lowpass filter, a highpass filter, a notch filter, a frequency shifter, and a power amplifier.

In systems intended for high volume production, it is highly desirable to reduce the part count and cost of a communication system. It is especially desirable to avoid the need for a frequency shifter which is a complicated and relatively expensive component.

Modern automobiles typically include an audio entertainment system (e.g., a radio) and often include a mobile transceiver (e.g., a cellular phone). In order to improve system operation and reduce cost, it is also desirable to integrate any passenger communication system with the audio entertainment system and/or the mobile transceiver.

SUMMARY OF THE INVENTION

It is a principal object of the present invention to provide an audio communication system for use in the passenger compartment of a vehicle which enables the front passengers to be heard more clearly by the rear passengers.

It is another object of the invention to provide a communication system for a passenger vehicle which is not affected by acoustic feedback and which has a low part count.

It is further object of the invention to provide a communication system for a passenger vehicle which is readily integrated with an audio entertainment system and/or a mobile transceiver.

BRIEF DESCRIPTION OF THE DRAWINGS

The novel features of the invention are set forth with particularity in the appended claims. The invention itself, however, both as to its organization and method of operation together with further objects and advantages thereof, may best be understood by reference to the following description taken in conjunction with the accompanying drawings in which:

FIG. 3 is a schematic diagram showing the communication system of FIG. 1 in greater detail.

FIG. 4 is a schematic diagram showing the communication system of the present invention integrated with an audio entertainment system and a cellular phone.

DETAILED DESCRIPTION OF PREFERRED EMBODIMENTS

Figure 1:
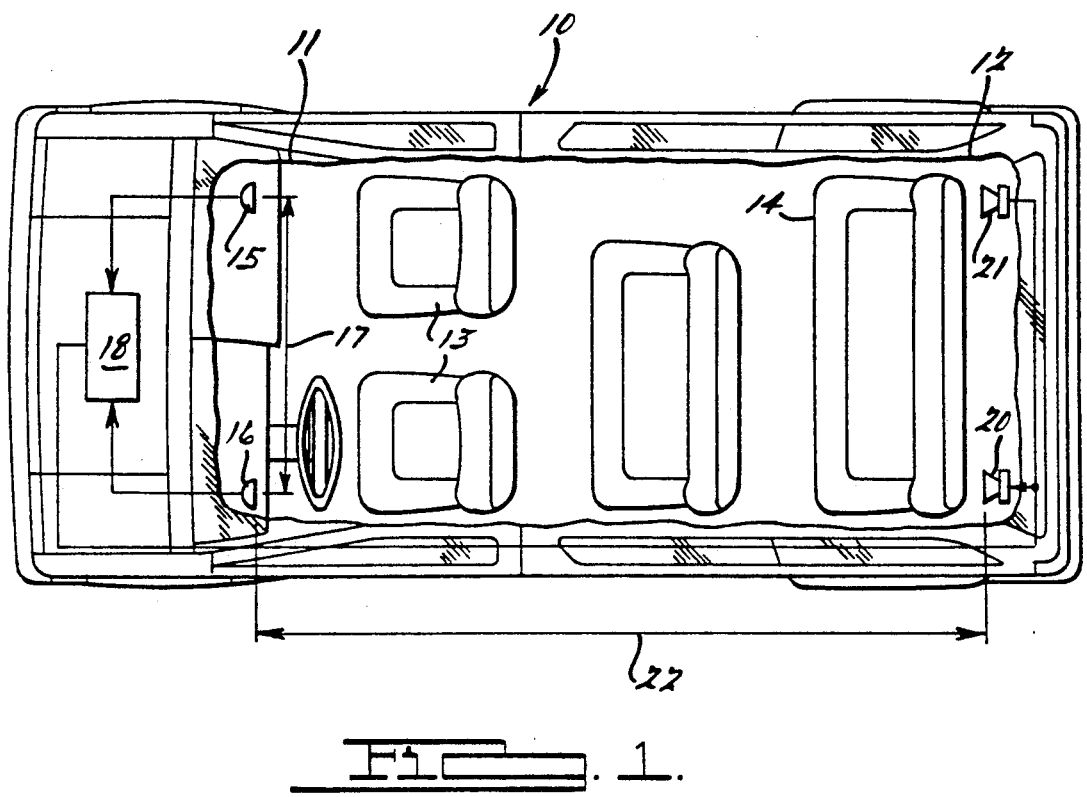
FIG. 1 is a top view showing a communication system of the present invention incorporated into a passenger vehicle.

FIG. 1 shows a passenger compartment 10 of a vehicle having a front end 11 and a rear end 12. A front seat 13 provides seating for a driver and other front passengers, and a rear seat 14 provides seating for the rear passengers. A pair of input microphones 15 and 16 are located at the front end 11 of the passenger compartment and are separated by a first distance 17. Electrical signals from microphones 15 and 16 are provided to a processing circuit 18 which amplifies the signals and provides output signals to a speaker 20 and a speaker 21.

Speakers 20 and 21 are located at rear end 12 of the passenger compartment and are at a second distance 22 from microphones 15 and 16. Speakers 20 and 21 are preferably located at the rear deck or side panels of the passenger compartment and are preferably the same speakers as are used by an audio entertainment system in the vehicle.

Figure 2:
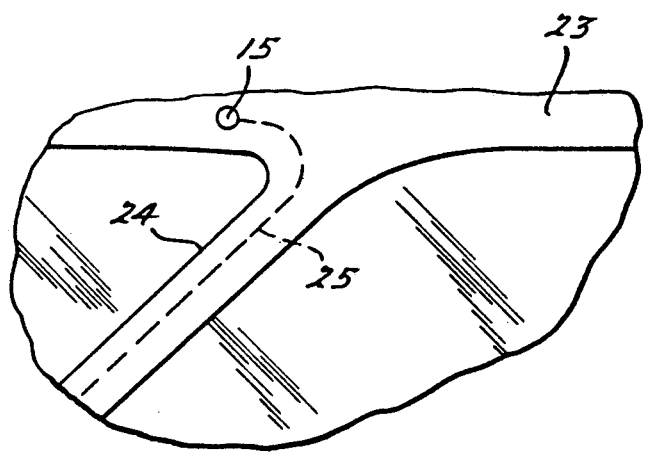
FIG. 2 shows the incorporation of a microphone used in the present invention in the headliner of a vehicle.

Microphones 15 and 16 may Preferably be located in the headliner of the passenger compartment near the driver and front passenger sun visors. As shown in FIG. 2, microphone 15 can be located in the headliner adjacent a vehicle roof 23 near an "A" pillar 24. A conductor 25 connects microphone 15 with the processing circuit which may be located behind a vehicle dashboard, for example.

FIG. 3 shows processing circuit 18 in greater detail. A differential amplifier 26 receives a first microphone signal from microphone 15 at its inverting input and receives a second microphone signal from microphone 16 at its noninverting input. The output from differential amplifier 26 passes through a bandpass filter 27 and a notch filter 28 to the input of a power amplifier 29 which drives speakers 20 and 21.

Processing circuit 18 amplifies speech signals from the driver or front seat passenger in a manner which avoids acoustic feedback, as follows. Due to the common mode rejection of differential amplifier 26, input signals which are equally applied to both the inverting and noninverting inputs are rejected (i.e., not amplified) by the differential amplifier. However, signals which are unequal in phase or magnitude do produce an output from differential amplifier 26. Since the driver or front seat passenger are located closer to one or the other of microphones 15 and 16, their speech will create microphone signals differing in phase and in magnitude allowing differential amplifier 26 to "pass" those voice signals. However, since microphones 15 and 16 are closely spaced relative to the distance to speakers 20 and 21, sound generated by speakers 20 and 21 create substantially equal signals in microphones 15 and 16. Therefore, the microphone signals resulting from the speaker outputs do not contribute to the output of differential amplifier 26 and acoustic feedback is substantially prevented.

The output of differential amplifier 26 is passed through bandpass filter 27 to reduce road and wind noise that is reproduced by the communication system. A preferred passband is about 300 Hz to about 3,000 Hz. One or more notch filters 28 are employed to eliminate any frequencies where acoustic feedback might still occur due to natural resonances of the passenger compartment, for example. A preferred notch filter is comprised of a twin "T" network. The number of notch filters and the frequencies to be cancelled vary depending upon the acoustic parameters (i.e., resonances) of the passenger compartment.

Power amplifier 29 preferably provides a fixed gain which is adequate to enhance conversation quality in the vehicle but which is at a level where acoustic feedback does not occur. Alternatively, the total gain of the system (i.e, volume) can be controlled by the passengers up to a maximum gain which corresponds to a gain below the level where acoustic feedback is likely to occur.

FIG. 4 shows a preferred embodiment for integrating the communication system of the present invention with an audio entertainment system and a cellular phone to minimize total component count. Specifically, a front seat to rear seat communication system is provided which shares microphones with a cellular phone and shares speakers with an audio system.

An audio entertainment system, such as, a radio, a cassette player, and/or CD system, employs audio circuits 30 to generate a four channel output consisting of right front (RF), left front (LF), right rear (RR), and left rear (LR) signals. A microcontroller 31 is connected with audio circuits 30 to control operation of the audio system in response to operator inputs. The RF, LF, RR, and LR signals are amplified by amplifiers 32, 33, 36, and 37, respectively, and are reproduced in speakers 38, 39, 21, and 20, respectively.

A summer 34 is connected between audio circuits 30 and amplifier 36. A summer 35 is connected between audio circuits 30 and amplifier 37.

The communication system includes microphones 15 and 16 connected to differential amplifier 26. The differential amplifier output signal is coupled through bandpass filter 27 and notch filter 28 to the input of a switch 40 (e.g., a transistor switch) which is controlled by microcontroller 31. The output of switch 40 is connected to summing inputs on summers 34 and 35. When microcontroller 31 causes switch 40 to be closed, communication signals from the output of notch filter 28 are coupled to summers 34 and 36 where they are added with any audio signals for the rear speakers. At the time when microcontroller 31 closes switch 40, it may also either mute or reduce the gain of audio signals from audio circuits 30 if desired to further improve the ability of rear seat passengers to hear front seat conversation.

Microphones 15 and 16 are connected to inputs of a double-pole, double-throw switch 42 (also constructed with transistors). Switch 42 has one pair of outputs connected to differential amplifier 26 and another pair of outputs connected to a hands-free mobile transceiver unit, such as a cellular phone 41. Switch 42 has a control input connected to microcontroller 31 for determining which pair of switch outputs are connected to microphones 15 and 16. Cellular phone 41 is connected to microcontroller 31 so that microcontroller 31 can place switch 42 in a condition where microphone signals are coupled to cellular phone 41 when cellular phone 41 is operating in a hands-free mode. When cellular phone is not in a hands-free mode and when the operator inputs to microcontroller 31 indicate that the communication system is active, microcontroller 31 switches microphone signals to the inputs of differential amplifier 26.

Cellular phone 41 can be operated with just one microphone. Thus, one microphone may be dedicated solely to the communication system while the other microphone is selectively connected to either the cellular phone or the communication system. Furthermore, the communication signals could be added to only one or the other of the right rear or left rear speaker signals.

Although analog circuits are shown in the preferred embodiments, it will be clear to those skilled in the art that digital circuits could be employed to obtain equivalent signal processing (e.g., differential amplification, bandpass filtering, notch filtering, and summing of signals).

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. Audio apparatus for use in the passenger compartment of a vehicle comprising:
   a first microphone generating first microphone signals and located at one end of said passenger compartment;
   a second microphone generating second microphone signals and located at said one end of said passenger compartment separated from said first microphone by a first distance such that a passenger at said one end of said passenger compartment is located substantially closer to one of said first and second microphones than the other of said first and second microphones;
   differential amplifier means having inverting and noninverting inputs receiving said first and second microphone signals, respectively; and
   a speaker located at the other end of said passenger compartment and connected to said differential amplifier means to produce sound in response to an output signal from said differential amplifier means, said speaker being separated from said first and second microphones by respective distances greater than said first distance so that sound produced by said speaker arrives at said first and second microphones substantially in phase.

2. The apparatus of claim 1 further comprising a bandpass filter coupled between said differential amplifier means and said speaker.

3. The apparatus of claim 2 wherein said bandpass filter has a lower cutoff frequency of about 300 Hertz.

4. The apparatus of claim 2 wherein said bandpass filter has an upper cutoff frequency of about 3000 Hertz.

5. The apparatus of claim 1 further comprising a notch filter coupled between said differential amplifier means and said speaker, said notch filter having a notch frequency corresponding to a resonant frequency of said passenger compartment.

6. The apparatus of claim 1 further comprising a power amplifier coupled between said differential amplifier means and said speaker.

7. The apparatus of claim 6 further comprising radio means for reproducing radio broadcast signals, wherein both said radio broadcast signals and said output signal from said differential amplifier means are reproduced by said speaker.

8. The apparatus of claim 7 further comprising a summer for adding said radio broadcast signals to said output signal from said differential amplifier means to generate a sum signal which is provided to the input of said power amplifier.

9. The apparatus of claim 1 further comprising a hands-free mobile transceiver coupled to at least one of said microphones.

10. The apparatus of claim 9 further comprising switch means connected to said at least one microphone, said hands-free mobile transceiver, and said differential amplifier means for selectably connecting said at least one microphone with either said hands-free mobile transceiver or said differential amplifier means.

11. The apparatus of claim 1 wherein said vehicle includes a headliner at said one end of said passenger compartment, said first and second microphones being located in said headliner.

12. The apparatus of claim 1 wherein said one end of said passenger compartment corresponds to the front of said vehicle.

* * * * *